(12) United States Patent
Jung et al.

(10) Patent No.: US 9,168,471 B2
(45) Date of Patent: Oct. 27, 2015

(54) AIR FILTER MEDIUM COMBINING TWO MECHANISMS OF ACTION

(75) Inventors: Anke Jung, Nürnberg (DE); Andreas Seeberger, Bayreuth (DE)

(73) Assignee: IREMA-FILTER GMBH (DE)

( * ) Notice: Subject to any disclaimer, the term of this patent is extended or adjusted under 35 U.S.C. 154(b) by 0 days.

(21) Appl. No.: 13/988,554

(22) PCT Filed: Nov. 21, 2011

(86) PCT No.: PCT/EP2011/005854
§ 371 (c)(1),
(2), (4) Date: Jul. 3, 2013

(87) PCT Pub. No.: WO2012/069172
PCT Pub. Date: May 31, 2012

(65) Prior Publication Data
US 2013/0269529 A1    Oct. 17, 2013

(30) Foreign Application Priority Data

Nov. 22, 2010 (DE) .......................... 10 2010 052 155

(51) Int. Cl.
*B01D 46/00* (2006.01)
*B01D 39/14* (2006.01)
(Continued)

(52) U.S. Cl.
CPC ............ *B01D 39/14* (2013.01); *B01D 39/1623* (2013.01); *B29C 47/0054* (2013.01); *B01D 2239/069* (2013.01); *B01D 2239/10* (2013.01); *B01D 2239/1233* (2013.01)

(58) Field of Classification Search
CPC ............... B01D 39/163; B01D 46/521; B01D 46/2411; B01D 2275/10; B01D 2279/50; D04H 13/007
USPC .......... 55/282.3, 302, 523, DIG. 10, DIG. 30; 95/278, 280; 428/219, 222; 442/382, 442/340, 337; 422/177
See application file for complete search history.

(56) References Cited

U.S. PATENT DOCUMENTS 3,557,801 A    1/1971  Jamison
4,173,504 A   11/1979  Tomioka
(Continued)

FOREIGN PATENT DOCUMENTS

DE    2801211        7/1978
DE    41 23 122 A1   1/1993
(Continued)

OTHER PUBLICATIONS

International Search Report for PCT/EP2013/001463 dated Jun. 25, 2014.
(Continued)

*Primary Examiner* — Robert A Hopkins
*Assistant Examiner* — Minh-Chau Pham
(74) *Attorney, Agent, or Firm* — Niels Haun; Dann Dorfman Herrell & Skillman, PC

(57) ABSTRACT

An air filter medium consisting of a non-woven is provided, which is produced using a melting and spinning method and has a depth filter constituent and a surface filter constituent, wherein the air filter medium is configured such that it has long-lasting functionality owing to the depth filter constituent and can be substantially regenerated with a reverse pulse owing to the surface filter constituent.

19 Claims, 2 Drawing Sheets

(51) Int. Cl.
 *B01D 39/16* (2006.01)
 *B29C 47/00* (2006.01)

(56) References Cited

U.S. PATENT DOCUMENTS

| | | | |
|---|---|---|---|
| 4,551,402 A | | 11/1985 | Tamura |
| 4,592,815 A | | 6/1986 | Nakao |
| 4,741,941 A | | 5/1988 | Englebert |
| 4,886,527 A | * | 12/1989 | Fottinger et al. .................. 95/78 |
| 4,983,434 A | * | 1/1991 | Sassa ........................... 428/36.2 |
| 5,066,400 A | | 11/1991 | Rocklitz |
| 5,283,106 A | | 2/1994 | Seiler |
| 5,350,624 A | | 9/1994 | Georger |
| 5,456,069 A | | 10/1995 | Haerle |
| 5,670,044 A | | 9/1997 | Ogata |
| 5,672,399 A | | 9/1997 | Kahlbaugh et al. |
| 5,685,757 A | | 11/1997 | Kirsch |
| 5,817,415 A | | 10/1998 | Chou |
| 5,877,098 A | | 3/1999 | Tanaka |
| 6,071,419 A | | 6/2000 | Beier et al. |
| 6,110,243 A | * | 8/2000 | Wnenchak et al. ............. 55/379 |
| 6,114,017 A | | 9/2000 | Fabbricante |
| 6,123,752 A | | 9/2000 | Wu |
| 6,146,436 A | * | 11/2000 | Hollingsworth et al. ....... 55/486 |
| 6,315,805 B1 | | 11/2001 | Strauss |
| 6,319,865 B1 | | 11/2001 | Mikami |
| 6,387,144 B1 | | 5/2002 | Jaroszczyk |
| 7,527,671 B1 | * | 5/2009 | Stuecker et al. ................ 95/273 |
| 7,625,418 B1 | | 12/2009 | Choi |
| 7,625,433 B2 | * | 12/2009 | Bach et al. ...................... 95/278 |
| 8,021,467 B2 | * | 9/2011 | Zimmer ......................... 95/279 |
| 8,211,195 B2 | * | 7/2012 | Bass et al. ........................ 55/361 |
| 8,308,834 B2 | | 11/2012 | Smithies |
| 8,715,391 B2 | * | 5/2014 | Wang et al. ....................... 95/45 |
| 8,834,762 B2 | * | 9/2014 | Jung et al. ................ 264/172.18 |
| 2002/0095920 A1 | | 7/2002 | Takagaki |
| 2003/0201579 A1 | | 10/2003 | Gordon |
| 2004/0245171 A1 | | 12/2004 | Schimmel |
| 2005/0129897 A1 | | 6/2005 | Zhou |
| 2005/0139544 A1 | | 6/2005 | Choi |
| 2005/0235619 A1 | * | 10/2005 | Heinz et al. ..................... 55/486 |
| 2006/0000196 A1 | | 1/2006 | Beier et al. |
| 2006/0014460 A1 | | 1/2006 | Alexander et al. |
| 2008/0026172 A1 | | 1/2008 | Stelter |
| 2008/0314010 A1 | | 12/2008 | Smithies |
| 2009/0117803 A1 | | 5/2009 | Jung et al. |
| 2009/0199715 A1 | | 8/2009 | Koschak |
| 2010/0101199 A1 | | 4/2010 | Veeser |
| 2010/0119794 A1 | * | 5/2010 | Manstein et al. ............. 428/219 |
| 2010/0186595 A1 | * | 7/2010 | Huang ............................ 96/226 |
| 2010/0313757 A1 | | 12/2010 | Crabtree |
| 2012/0187593 A1 | | 7/2012 | Jung et al. |
| 2013/0306548 A1 | | 11/2013 | Kreibig |
| 2014/0014572 A1 | * | 1/2014 | Mbadinga-Mouanda et al. ............................ 210/489 |
| 2015/0128545 A1 | | 5/2015 | Seeberger |

FOREIGN PATENT DOCUMENTS

| | | |
|---|---|---|
| DE | 4217195 A1 | 11/1993 |
| DE | 4443158 A1 | 6/1996 |
| DE | 19618758 | 11/1997 |
| DE | 693 22 572 T2 | 12/1998 |
| DE | 69320027 T2 | 2/1999 |
| DE | 29907699 | 8/1999 |
| DE | 19920983 | 11/2000 |
| DE | 69914346 | 7/2001 |
| DE | 69331065 | 10/2001 |
| DE | 10026281 | 12/2001 |
| DE | 60100409 | 7/2003 |
| DE | 10310435 | 6/2004 |
| DE | 10257833 A1 | 7/2004 |
| DE | 10 2004 036 440 A | 2/2005 |
| DE | 102004048291 | 4/2006 |
| DE | 102004060593 A1 | 6/2006 |
| DE | 102005026156 A1 | 12/2006 |
| DE | 102005055607 | 3/2007 |
| DE | 202007005847 U1 | 8/2007 |
| DE | 102006013170 | 9/2007 |
| DE | 102007011365 | 9/2008 |
| DE | 102009026276 A1 | 2/2010 |
| EP | 0250005 A1 | 12/1987 |
| EP | 0109619 | 5/1988 |
| EP | 0379032 A1 | 7/1990 |
| EP | 0590307 | 4/1994 |
| EP | 0 674 035 A2 | 9/1995 |
| EP | 0432586 B1 | 7/1996 |
| EP | 0867216 A1 | 9/1998 |
| EP | 0904819 | 3/1999 |
| EP | 0695383 | 10/2001 |
| EP | 1198279 B1 | 4/2002 |
| EP | 1637632 A1 | 3/2006 |
| EP | 1790406 A2 | 5/2007 |
| EP | 1970111 A1 | 9/2008 |
| EP | 1970111 B2 | 7/2010 |
| GB | 941082 | 11/1963 |
| GB | 2404347 | 2/2005 |
| JP | S59141173 | 8/1984 |
| JP | 02 264 057 A | 10/1990 |
| JP | H0440206 A | 2/1992 |
| JP | 5 321 115 A | 12/1993 |
| JP | 6 346 310 | 12/1994 |
| JP | 1997503958 | 4/1997 |
| JP | 2002219315 A | 8/2002 |
| JP | 2006341220 A | 12/2006 |
| JP | 2007170224 | 7/2007 |
| JP | 2007265778 A | 10/2007 |
| RU | 2 188 693 C2 | 11/2000 |
| RU | 2 198 718 C1 | 10/2001 |
| WO | 9216361 | 10/1992 |
| WO | 9216361 A1 | 10/1992 |
| WO | 9705306 | 2/1997 |
| WO | 0013765 | 3/2000 |
| WO | 0186043 | 11/2001 |
| WO | 03013732 | 2/2003 |
| WO | 2005060811 A1 | 7/2005 |
| WO | 2006002684 | 1/2006 |
| WO | WO 2006/049664 A1 | 5/2006 |
| WO | 2005060696 A3 | 6/2006 |
| WO | 2007053204 A1 | 5/2007 |
| WO | 2007061457 | 5/2007 |
| WO | 2007112877 A2 | 10/2007 |
| WO | 2008016771 A1 | 2/2008 |
| WO | 2007143243 A3 | 2/2009 |
| WO | 2011002878 | 1/2011 |
| WO | 2012034679 | 3/2012 |
| WO | 2012069172 A2 | 5/2012 |
| WO | 2012097973 A1 | 7/2012 |

OTHER PUBLICATIONS

Examination Report dated Mar. 10, 2015 in corresponding German application No. 10 2012 011 065.0.
International Search Report for PCT/EP2014/001290 date Mar. 31, 2014.
International Seach Report and Written Opinion dated Jul. 4, 2012 corresponding to PCT/EP2011/005854.
International Search Report for corresponding application PCT/EP2007/002650 dated Jan. 16, 2008.
Hutten, Irwin M., "Handbook of Nonwoven Filter Media", 2007, 12 pages.
International Preliminary Report on Patentability dated Dec. 8, 2014 corresponding to PCT/EP2013/001634.
Office Action in corresponding Japanese application 362967 dated Aug. 11, 2015.

* cited by examiner

AIR FILTER MEDIUM COMBINING TWO MECHANISMS OF ACTION

BACKGROUND OF THE INVENTION

The invention relates to an air filter medium in the form of a layer-like non-woven material. Such filter media are used in filters, for example in indoor air filters and air conditioning systems, in particular however in air filters for the motor vehicle interior or for engines.

The filter media are produced in a melting and spinning method such as a spunbond method or a melt-blown method as is described for example in DE 41 23 122 A1.

The intake air of internal combustion engines for example in motor vehicles or in the off-road area is usually filtered to protect the engine combustion chamber from mechanical damage owing to sucked-in particles from the ambient air. An important criterion in the design of the filter elements is to ensure a long service life of the filter while at the same time separating out a high proportion of the sucked-in particles.

Motor vehicles have a precisely calculated energy distribution system. Only limited amounts of energy are available to the heating/ventilation/air-conditioning area. The costs of vehicle components must also vary only within a very narrow range. On the other hand, car buyers are making greater and greater demands in terms of comfort and safety. In consideration of these aspects, particle filters with the smallest possible fall in pressure or differential pressure are of particular significance, as only a low pressure has to be generated by the fan motor and energy consumption is therefore low. Furthermore, the latter operates more quietly owing to the lower power needed, as a result of which the noise is reduced and therefore driving comfort is substantially increased.

The demand for filter systems with low differential pressure competes with the demanded separation performance and service life, that is, the time expressed in mileage that a filter can remain in the vehicle until it must be replaced.

For example, pollen filters which only filter pollen out of the inflowing air in the vehicle are not sufficient for the vehicle interior. The allergens to which the immune system of allergic persons reacts are proteins, the diameter of which is only a fraction of the diameter of pollen. They are in a size range of around 0.1 μm, that is, the range which has the greatest problems for particle filters, what is known as the MPPS (most penetrating particle size). Correspondingly, the separation performance in this size range should be at least 50% and is measured by means of an aerosol, the particles of which have approximately the same density, for example NaCl. At the same time, service lives of at least 30,000 kilometers can be achieved with such filters when installed in motor vehicles.

EP 1 198 279 B1 discloses a melt-blown non-woven fabric which consists of at least two layers, one layer consisting of microfibres while the other layer consists of macrofibres. The layers are layered on top of each other and adhere to each other by means of connections between the fibres. However, if non-woven fabrics of this type in the field of air filtration, they become clogged very quickly owing to the particles present in the air. A fundamental difference is drawn between two types of filter and filter processes.

Surface filters have a relatively smooth, dense filter medium, which results in a filter cake building up on the surface on the inflow side of the filter medium, which filter cake supports the filter effect within a short time. However, the loss in pressure, i.e. the differential pressure, across the filter medium increases rapidly. If a critical value is reached, a reverse pulse is usually output onto the medium in the direction counter to the normal air flow direction, so the filter cake largely falls off the medium (except for a little residue) and the filter medium is virtually regenerated. The pulses are often repeatable, but the efficiency of the regeneration is reduced over time, so the filter must be replaced.

Depth filters have rather open-pored fibre material, which picks up dirt particles over the entire depth of the medium. This is often constructed three-dimensionally, i.e. there are coarse fibre diameters on the inflow side and fine ones on the outflow side. The dirt particles pass into the medium and are arrested and retained upstream of the fine fibre layer. The pressure loss of this filter medium increases only slowly. However, it is not possible to clean it off, as the dirt particles are embedded in the open-pored fibre material.

There is thus a conflict between two effects: Either a filter is chosen which builds up a high differential pressure within a short time and therefore must be cleaned off often (surface filter) or a filter is chosen which can absorb more particles before the differential pressure reaches a critical value but cannot be cleaned off (depth filter).

The object of the present invention is to overcome the stated disadvantages and provide an air filter medium which is easy to produce and cost-effective.

BRIEF SUMMARY OF THE INVENTION

This object is achieved by providing, as set forth herein, an air filter medium, an air filter, a method for producing an air filter medium and a method for filtering air. Advantageous configurations are also recited herein.

An air filter medium within the meaning of the invention is any type of material which is suitable for cleaning air.

A melting and spinning method within the meaning of the invention is any method in which a non-woven is produced from starting substances by laying the processed starting substances on a substrate. The starting substances are in this case in particular processed by being sprayed out of nozzles in the melted state.

Able to be regenerated within the meaning of the invention means that a filter medium can be at least partially cleaned by a working step and is ideally restored to its starting state. This can be achieved for example by means of a reverse pulse, suction, burning off and/or mechanical knocking off. In this case filtered particles are in particular removed from the filter medium or shifted in such a manner that the air resistance of the filter medium is reduced.

Open-pored within the meaning of the invention means that the filter medium has pores which are not closed, that is, with which the chambers formed by pores are connected.

The thickness within the meaning of the invention is defined perpendicularly to the surface of the filter material.

In the direction of the air flow to be filtered within the meaning of the invention means in a direction from the inflow side to the outflow side of the filter medium.

Differential pressure within the meaning of the invention is the fall in pressure of an air flow when it flows through a filter or filter medium.

Because of the combination of a depth filter constituent with a surface filter constituent, the filter medium has a high absorption capacity for particles, which are retained in the depth filter portion, and the surface filter portion can be regenerated. A filter medium is thus provided which ensures a long service life, i.e. the slowest possible increase in the differential pressure, and at the same time creates the possibility of at least partially regenerating the filter medium. The service life is thereby substantially longer compared to mere depth filters and the time intervals between necessary regeneration measures by means of reverse pulses are extended compared to a mere surface filter.

Furthermore, high separation performance is ensured at all times and the production of the air filter material is cost-effective as it can be produced in one working process.

In a preferred embodiment, the air filter medium has a regular three-dimensional macrostructure, which preferably consists of four- or six-sided pyramids, cones, curved parts, corrugations or scores.

A three-dimensional macrostructure within the meaning of the invention is any type of structure which is situated on the surface of the filter medium. Macrostructure within the meaning of the invention is a structure which can be perceived visually without an aid and/or at least in a tactile manner.

In particular the coexistence of the depth filter constituent and the surface filter constituent on the inflow-side surface of the air filter material is realised by means of the macrostructure. The parts of the macrostructure of the filter can then form the depth filter constituent, while the surface filter constituent is arranged between the macrostructure.

The macrostructure is preferably applied to the filter medium on the inflow side.

The inflow area of the filter medium is enlarged by the macrostructure on the inflow side of the filter medium.

Depending on the height and thickness of the macrostructures of the filter medium, the inflow area can be increased by up to a multiple of the inflow area of a substantially flat material.

The increase in the inflow area causes a reduction in the pressure loss or differential pressure of the air flowing through and a reduction in the air resistance of the filter medium and/or of the finished filter.

In a further preferred embodiment, the depth filter constituent is arranged on the surface filter constituent, which forms a continuous layer.

A continuous layer within the meaning of the invention extends over the entire area of the filter medium.

This arrangement ensures that the fibre diameter of the surface filter constituent over the entire area of the filter medium is never too small.

In a further preferred embodiment, the depth filter constituent accounts for 50 to 90%, preferably 50 to 70%, more preferably 70 to 90% of the surface of the non-woven.

Owing to the relatively large area of the depth filter constituent, the filter medium has a large absorption capacity for particles, so a long service life before regeneration or replacement of the filter medium becomes necessary is achieved.

BRIEF DESCRIPTION OF THE DRAWINGS

Exemplary embodiments of the invention are now described in more detail using drawings.

DETAILED DESCRIPTION OF THE INVENTION

Figure 1:
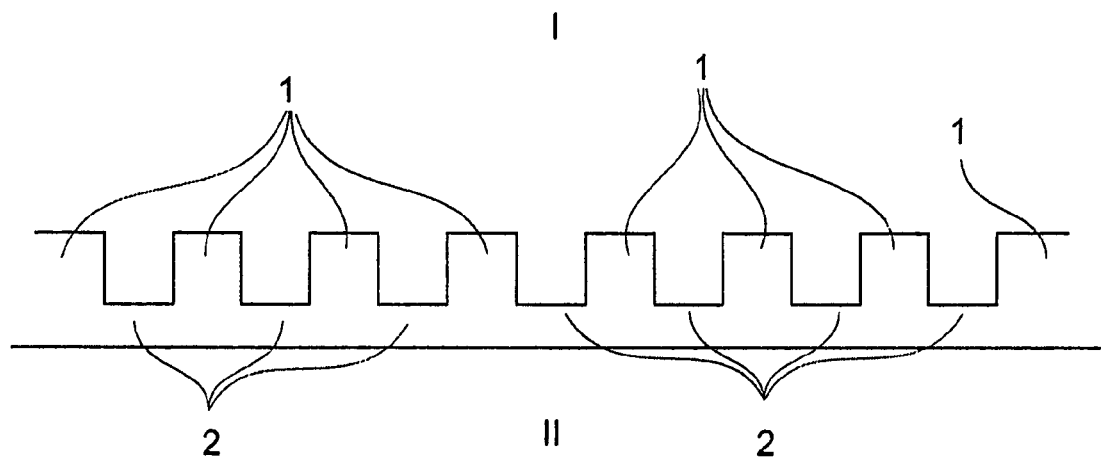
FIG. 1 shows a cross section of a first embodiment of the filter medium according to the invention.

As can be seen in FIG. 1, the filter medium according to the invention is formed from two constituents. Depth filter constituents 1 are arranged in an alternating manner with surface filter constituents 2. The depth filter constituent 1 has macrostructures at least on the inflow side I, i.e. on the side on which the air flow to be filtered arrives. These macrostructures can have any three-dimensional shape which contributes to the improvement in filter performance. The depth filter constituent 1 is characterised in that its fibre diameters vary over its cross section. For instance, coarse fibre diameters are arranged on the inflow side I, fine ones are arranged on the outflow side II. The surface filter constituent 2 of the filter is situated in the interspaces of the macrostructures of the depth filter constituent 1 and predominantly has such a fibre structure that no particles penetrate it.

Figure 2:
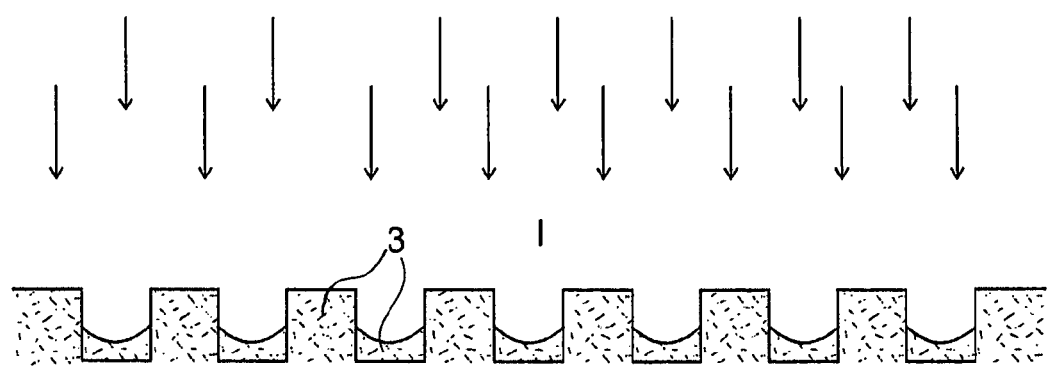
FIG. 2 shows the deposition of particles with a filter medium according to the first embodiment.

As shown in FIG. 2, particles situated in the air flow to be filtered, the air flow direction of which during normal operation is indicated with arrows, are filtered by two mechanisms:

Firstly, particles 3 to be filtered penetrate into the depth filter constituent 1 on the inflow side and are deposited therein. The variation of the fibre diameters in the air flow direction means that first coarse particles 3 are filtered, while finer particles 3 penetrate further into the interior of the filter.

Secondly, particles 3 to be filtered are deposited on the surface filter constituent 2. In this case the particles 3 do not penetrate or penetrate only slightly into the air filter medium and are therefore deposited on the surface as a filter cake, as is shown in FIG. 2.

During the air filtering process, first the surface filter region 2 which lies further to the inflow side I of a filter consisting of the filter medium according to the invention is clogged with particles 3 before the depth filter constituent 1 fills with particles 3.

The filter can thus still be used when the differential pressure increases owing to clogging of the surface filter constituent 2, the filter effect then mostly taking place by means of the depth filter constituent 1. The latter has a substantially higher absorption capacity for particles 3 than the surface filter constituent 2, as the particles 3 can be retained in the three-dimensional structure.

The user then has the option of regenerating the surface filter constituent 2 by means of a reverse pulse, with which air is blown in a direction counter to the normal air flow direction of the air flow to be filtered, and/or by sucking the particles 3 off the surface of the air filter medium.

Figure 3:
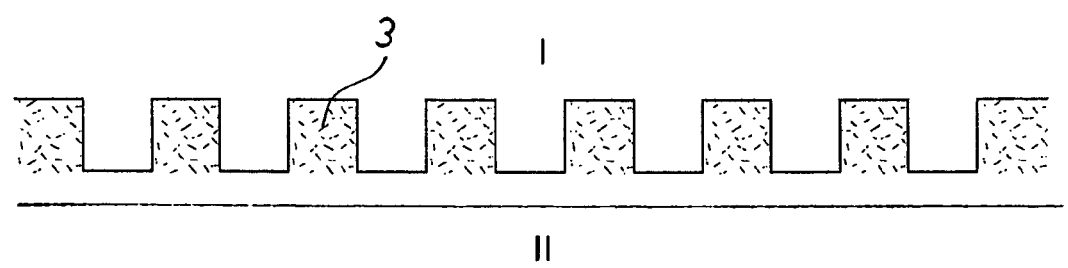
FIG. 3 shows the regenerated filter medium following a reverse pulse.

FIG. 3 shows an air filter medium regenerated in this manner. The filter cakes on the surface filter constituent 2 are removed and only the particles 3 embedded in the macrostructures of the depth filter constituents 1 remain in the filter.

This regeneration means that large amounts of particles 3 can again be absorbed by the air filter medium. This process can be repeated until the depth filter constituent 1 is completely clogged with particles 3 and the pressure difference greatly increases owing to the reduced filter area. However, even in this case, the filter with the air filter medium according to the invention can still be used via the surface filter constituent 2 in the interim.

Figure 4:
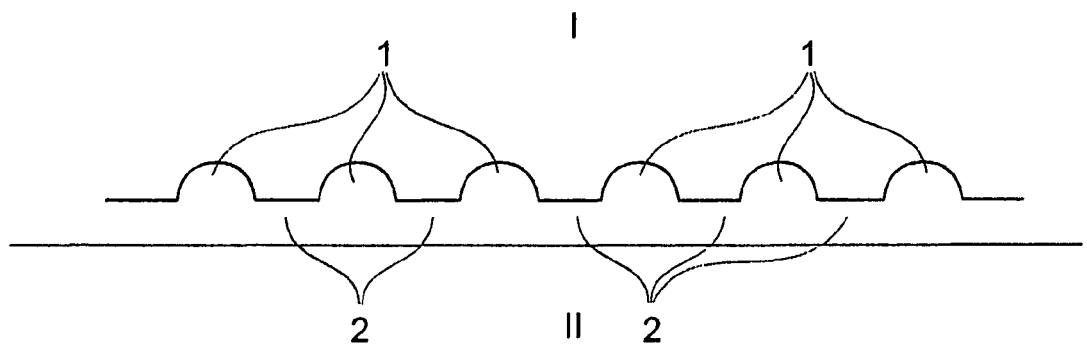
FIG. 4 shows a cross section through a second embodiment of the filter medium according to the invention.
Figure 5:
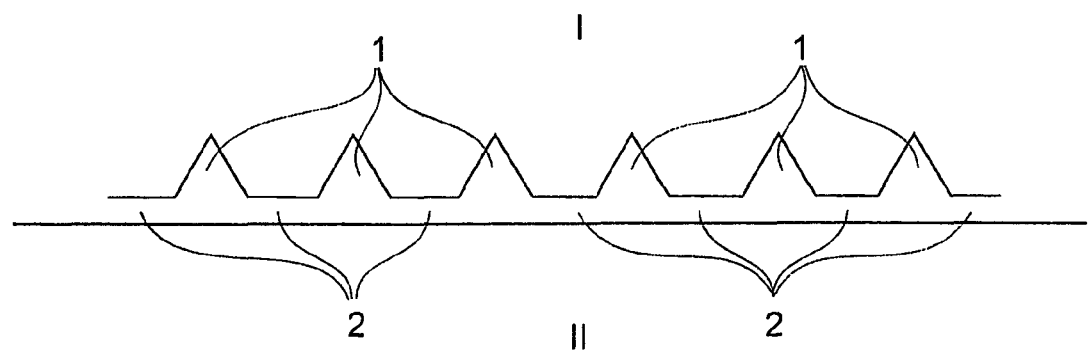
FIG. 5 shows a cross section through a third embodiment of the filter medium according to the invention.

FIGS. 4 and 5 show alternative embodiments of the present invention. These differ from the first embodiment in the different shapes of the macrostructures. In all the embodiments, the macrostructures can be arranged on the air filter medium as isolated structures or form a regular macrostructure. The macrostructures can be formed as rows or arranged in the manner of a chess board or honeycomb. A wide variety of shapes such as multi-sided, for example four- or six-sided pyramids, cones, curved parts, corrugations or scores are possible depending on the application. The macrostructures can additionally act as spacers from a further layer of the air filter medium.

Alternatively to the alternating arrangement of the surface filter constituents 2 and depth filter constituents 1, the depth filter constituent 1 could also be arranged on the surface filter constituent 2 on the inflow side I.

Of course, both the depth filter constituent 1 and the surface filter region 2 can consist of one or a plurality of layers, which predominantly each have different fibre diameters.

The air filter medium according to the invention is preferably produced in a melting and spinning method such as a spunbond method or a melt-blown method, the depth filter region 1 with the macrostructures being produced by deep-drawing the non-woven during the production process. Separate processing of the non-woven is not preferably necessary to do this.

The invention claimed is:

1. An air filter medium comprising a non-woven material, which is produced using a melting and spinning method and has a first side, wherein selected portions of the first side include a depth filter constituent which picks up particles over the depth of the depth filter constituent and wherein selected portions of the first side include a surface filter constituent, configured to retain particles on the surface thereof, wherein the surface filter constituent can be at least partially regenerated with a reverse pulse to remove particles from the surface thereof, and wherein the air filter medium is configured such that it has long-lasting functionality owing to the depth filter constituent.

2. The air filter medium according to claim 1, wherein the depth filter constituent and/or the surface filter constituent comprises an open-pored fibre material.

3. The air filter medium according to claim 1, wherein the thickness of the surface filter constituent is smaller than the thickness of the depth filter constituent.

4. The air filter medium according to claim 1, wherein the surface filter constituent is substantially 0.1 mm to 1 mm thick and the depth filter constituent is substantially 1 mm to 8 mm thick.

5. The air filter medium according to claim 1, wherein the depth filter constituent comprises a deep-drawn non-woven material.

6. The air filter medium according to claim 1, wherein the depth filter constituent is arranged on the surface filter constituent, which forms a continuous layer.

7. The air filter medium according to claim 1, wherein the depth filter constituent is only arranged on one side of the surface filter constituent.

8. The air filter medium according to claim 1, which has a three-dimensional macrostructure, which preferably comprises four- or six-sided pyramids, cones, curved parts, corrugations or scores.

9. The air filter medium according to claim 8, wherein the macrostructure comprises the depth filter constituent.

10. The air filter medium according to claim 8, wherein the surface between the macrostructure is formed by the surface filter constituent.

11. The air filter medium according to claim 8, wherein the macrostructure is arranged on the inflow side.

12. The air filter medium according to claim 1, wherein most of the fibres of the surface filter constituent have a fibre diameter of less than 15 μm and more preferably between 0.1 μm and 10 μm and even more preferably between 0.5 μm and 8 μm, and most of the fibres of the depth filter constituent substantially have fibre diameters between 3 μm and 40 μm, preferably between 15 μm and 30 μm, more preferably between 20 μm and 30 μm.

13. The air filter medium according to claim 12, wherein the fibre diameter of the surface filter constituent and/or of the depth filter constituent decreases in the direction of the air flow to be filtered.

14. The air filter medium according to claim 1, wherein the air permeability is 200 to 3500 l/m$^2$s, preferably 800 to 2000 l/m$^2$s at a differential pressure of 200 Pa.

15. The air filter medium according to claim 1, wherein the depth filter constituent accounts for 50 to 90%, preferably 50 to 70%, more preferably 70 to 90% of the surface of the non-woven material.

16. An air filter having an air filter medium according to claim 1.

17. A method for producing an air filter medium according to claim 1, wherein the depth filter constituent is deep-drawn.

18. A method for filtering air with an air filter according to claim 16, wherein the air filter can be regenerated by means of a reverse pulse.

19. A method for producing an air filter medium having a non-woven material, comprising providing a melted material and spraying the melted material out of one or more nozzles in the melted state onto a substrate to create the air filter medium of claim 1.

* * * * *